US012106455B2

(12) United States Patent
Chiyoda et al.

(10) Patent No.: US 12,106,455 B2
(45) Date of Patent: Oct. 1, 2024

(54) AUTONOMOUS VEHICLE SYSTEM TESTING SIMULATOR

(71) Applicant: Hitachi Astemo, Ltd., Hitachinaka (JP)

(72) Inventors: Takayoshi Chiyoda, Hitachinaka (JP); Hiroaki Nakata, Tokyo (JP); Michio Morioka, Hitachinaka (JP); Masayuki Kanai, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 223 days.

(21) Appl. No.: 17/426,969

(22) PCT Filed: Feb. 7, 2020

(86) PCT No.: PCT/JP2020/004733
§ 371 (c)(1),
(2) Date: Jul. 29, 2021

(87) PCT Pub. No.: WO2020/189081
PCT Pub. Date: Sep. 24, 2020

(65) Prior Publication Data
US 2022/0101500 A1    Mar. 31, 2022

(30) Foreign Application Priority Data
Mar. 19, 2019    (JP) .................. 2019-051526

(51) Int. Cl.
*G06K 9/00*    (2022.01)
*G06T 5/70*    (2024.01)
(Continued)

(52) U.S. Cl.
CPC .................. *G06T 5/80* (2024.01); *G06T 5/70* (2024.01); *G06T 15/50* (2013.01); *H04N 13/106* (2018.05); *G06T 2207/10016* (2013.01)

(58) Field of Classification Search
CPC .................. B60R 1/00; G06V 20/58
See application file for complete search history.

(56) References Cited

U.S. PATENT DOCUMENTS

2009/0306880 A1* 12/2009 Gomi ..................... G09B 9/052
703/8
2018/0308281 A1   10/2018 Okoyama
(Continued)

FOREIGN PATENT DOCUMENTS

JP    2009-265915 A     11/2009
JP    2009265915    *  11/2009 ............. G06T 17/40
(Continued)

OTHER PUBLICATIONS

International Search Report, PCT/JP2020/004733, May 26, 2020 (4 pgs.).

*Primary Examiner* — Gregory A Morse
*Assistant Examiner* — Owais Iqbal Memon
(74) *Attorney, Agent, or Firm* — Volpe Koenig

(57) ABSTRACT

To provide evaluation by using a virtual video image generated by performing an optical image processing for lightness and distortion required by an evaluation object. An evaluation apparatus for a camera system including a camera for capturing a video image of outside view includes: a video generation unit for generating a simulation video image simulating the video image of outside view captured by the camera; an optical filter unit which performs an optical image processing on the simulation video image in order to simulate the video image outputted from the camera; and a camera image processing unit which generates a vehicle control signal by performing a recognition processing by using the processed video image.

11 Claims, 12 Drawing Sheets

(51) Int. Cl.
    *G06T 5/80*         (2024.01)
    *G06T 15/50*      (2011.01)
    *H04N 13/106*    (2018.01)

(56) References Cited

U.S. PATENT DOCUMENTS

2019/0220029 A1*   7/2019   Fukuhara ................. G06N 3/08
2019/0236380 A1*   8/2019   Fukuhara .......... G06F 18/24143

FOREIGN PATENT DOCUMENTS

| | | | | |
|---|---|---|---|---|
| JP | 2010-026845 A | | 2/2010 | |
| JP | 2010026845 | * | 2/2010 | ............. G06T 17/40 |
| JP | 2018-060511 A | | 4/2018 | |
| KR | 20130052400 | * | 5/2013 | ............. H04N 13/00 |
| WO | 2008/069189 A1 | | 6/2008 | |
| WO | 2017/171005 A | | 10/2017 | |

* cited by examiner

FIG.14
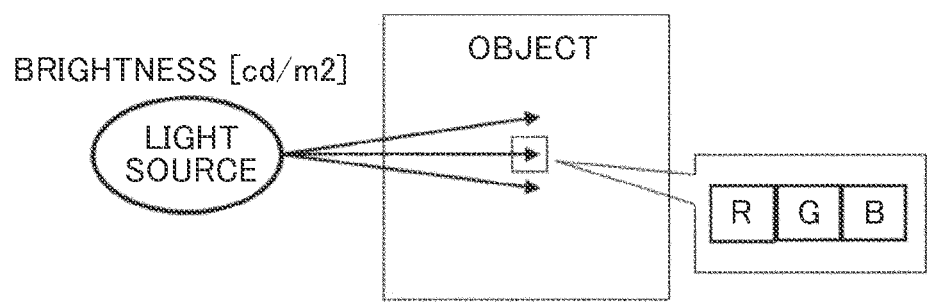
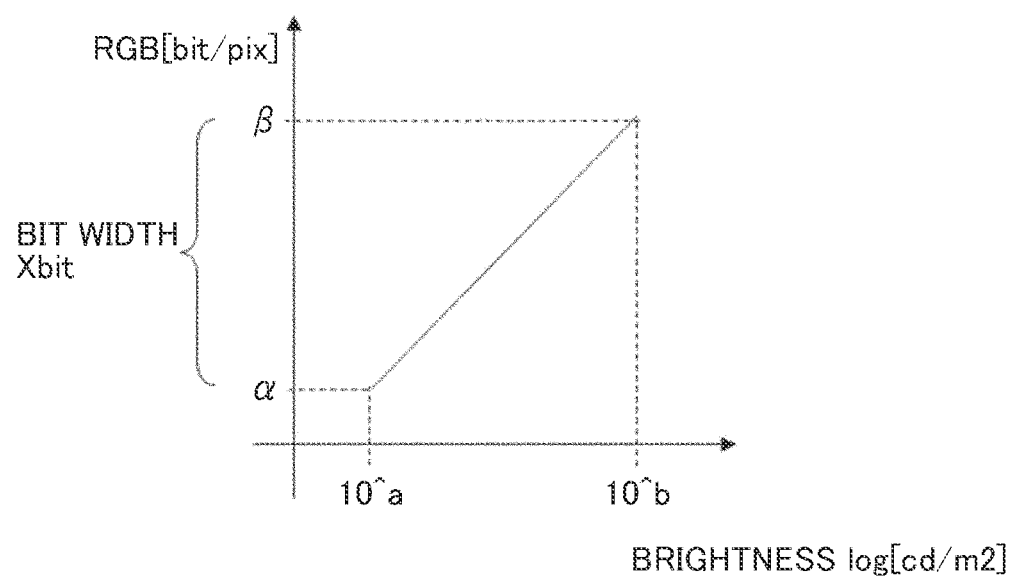

FIG.15
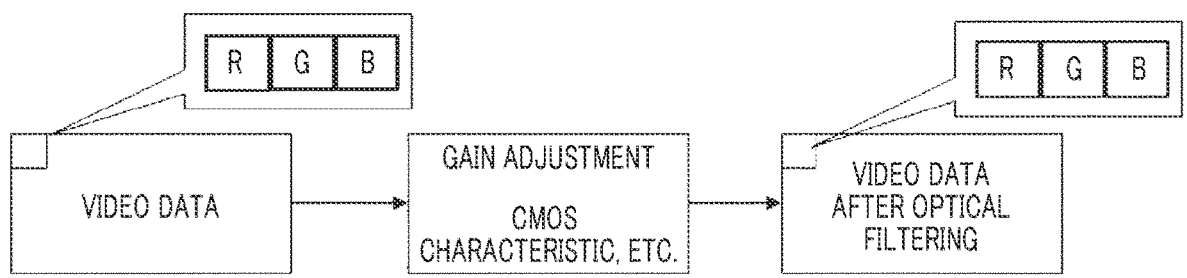
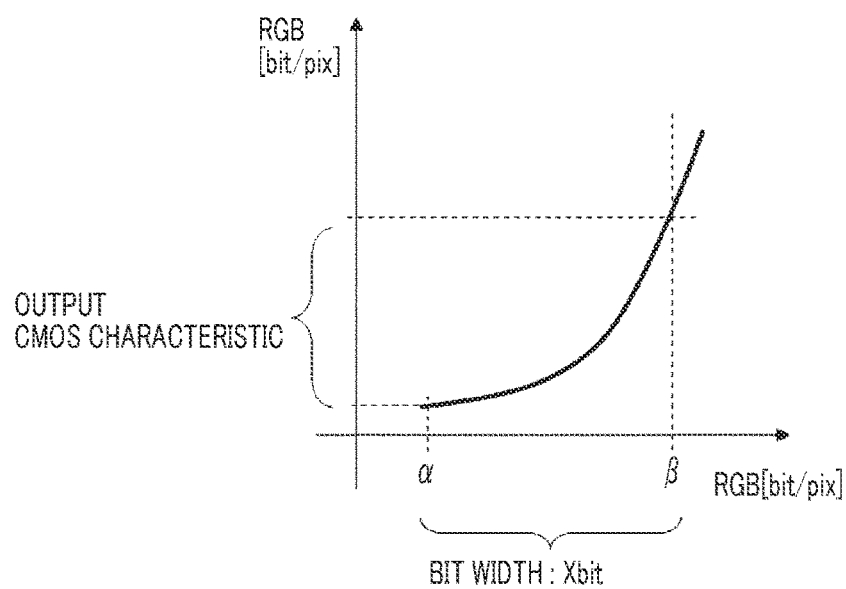

AUTONOMOUS VEHICLE SYSTEM TESTING SIMULATOR

TECHNICAL FIELD

The present invention relates to an evaluation apparatus which simulates the conditions of a vehicle running on a road and evaluates a camera system mounted on the vehicle.

BACKGROUND ART

In recent years, researches have been made on driving assistance systems and automated driving systems aiming at the realization of a safe and comfortable car society. In future, increased levels of automated driving technologies will lead to a need for developing complicated vehicle control logics concerning ambient environment or taking a left or right turn at a confluence of expressways or an intersection. Further, there will be a need for a test case of vast scale in order to verify and evaluate the complicated control logics for these functions. The verifications and evaluations are currently centered on actual vehicle travel. In the future the test process will include an enormous number of steps so that it will be difficult to provide an evaluation simply by making real vehicles travel. Accordingly, it is common to utilize simulators.

HILS (Hardware In the Loop Simulator) as a simulator for such a purpose is a tool for virtually evaluating a real control system. The tool uses a real thing as an evaluation object and forms an evaluation apparatus by modeling the other vehicle elements and combining together these elements. An apparatus disclosed in Patent Document 1, for example, is known as such a simulator.

CITATION LIST

Patent Literature

Patent Literature 1: Japanese Patent Application Laid-Open No. 2010-26845

SUMMARY OF INVENTION

Technical Problem

In a case where the HILS is constructed by using an evaluation object which performs an arithmetic processing based on different sensor information items, it is necessary to supply the sensor information at the timing when the evaluation object demands the sensor information. For example, a video image needs to be inputted to a camera as the evaluation object at the timing when the camera releases the shutter. Since it is impossible for the HILS to input a real video image to the evaluation object, a virtual video image of outside view generated by CG (Computer Graphics) is inputted. Essentially, the evaluation object is constantly making lightness adjustment and the like for lenses and an imaging device. It is desirable to also vary the virtual video image inputted to the evaluation object according to an instruction from the evaluation object.

According to the above-described patent document 1 (Japanese Patent Application Laid-Open No. 2010-26845), the simulator does not have a function to feed back a timing signal from the evaluation object (camera control ECU) into a camera model. Therefore, the simulator cannot input a required video image under the control of the evaluation object. As a result, the evaluation object cannot recognize the video image correctly nor control the vehicle based on the recognition result.

In this connection, an object of the invention is that when evaluating the evaluation object in an HILS environment using a CG video, the evaluation is provided by using a virtual video generated by using the information outputted from the evaluation object and by performing optical image processing for lightness, distortion and the like required by the evaluation object.

Solution to Problem

A typical example of the invention disclosed in this application is as follows.

According to an aspect of the invention, an evaluation apparatus for a camera system including a camera for capturing a video image of outside view, includes: a video generation unit for generating a simulation video image simulating the video image of outside view captured by the camera; an optical filter unit which performs an optical image processing on the simulation video image in order to simulate the video image outputted from the camera; and a camera image processing unit which generates a vehicle control signal by performing a recognition processing using the processed video image.

Advantageous Effects of Invention

According to one aspect of the invention, the camera image processing unit can be properly evaluated by using the virtual image subjected to the optical image processing for lightness and distortion required by the evaluation object. The problems, constitutions and effects other than the above will become apparent from the description of the following embodiments.

BRIEF DESCRIPTION OF DRAWINGS

FIG. 14 is a diagram showing a configuration of a viewpoint video CG video unit according to a fifth embodiment hereof; and FIG. 15 is a diagram showing a configuration of a gain adjustment processing unit according to the fifth embodiment hereof.

DESCRIPTION OF EMBODIMENTS

The embodiments of the invention will hereinbelow be described with reference to the accompanying drawings.

First Embodiment

Figure 1:
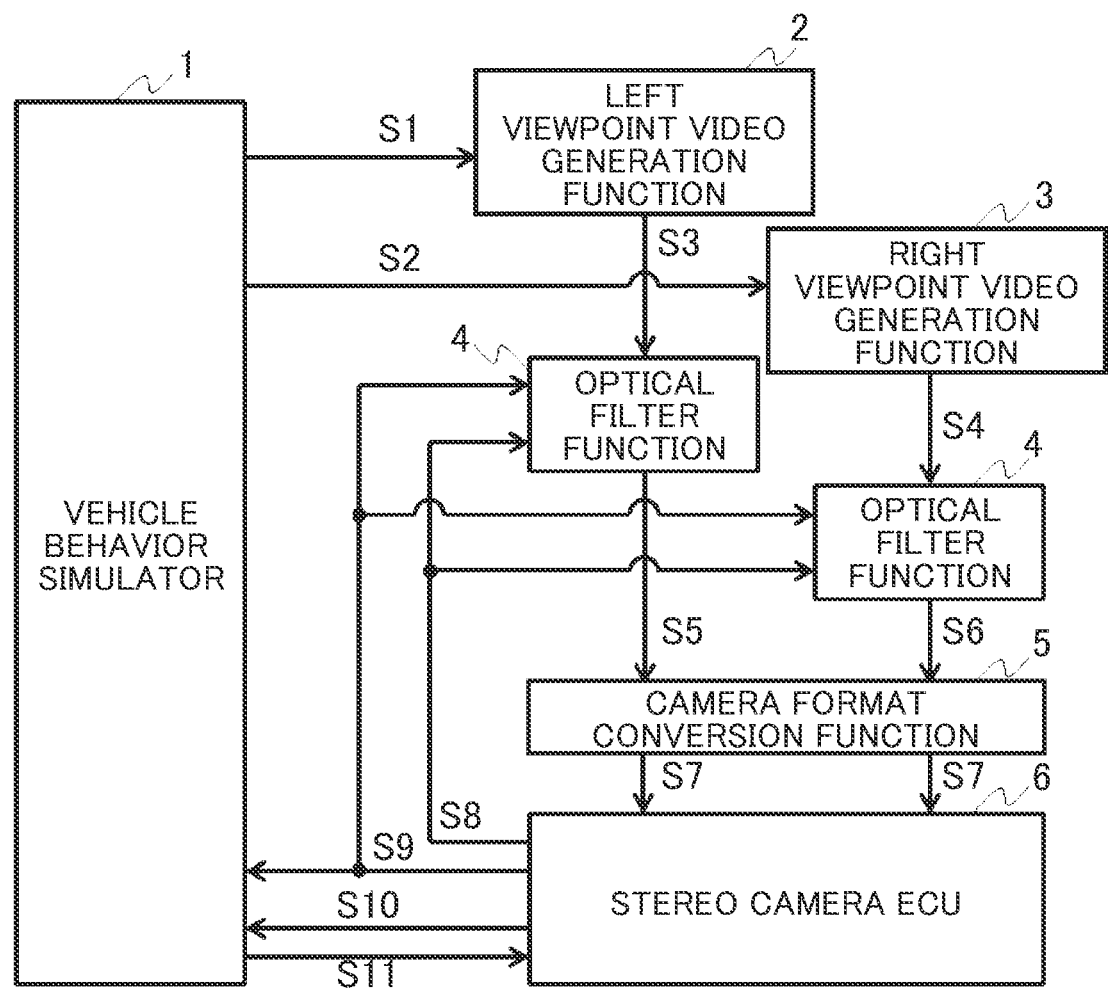
FIG. 1 is a diagram showing an exemplary configuration of HILS using an optical filter function according to an embodiment of the invention.

FIG. 1 is a diagram showing an exemplary configuration of HILS using an optical filter function according to an embodiment of the invention. An evaluation environment for evaluation of a stereo camera ECU 6 to which a CG video S7 is inputted includes: a vehicle behavior simulator 1; a left viewpoint video generation function 2; a right viewpoint video generation function 3; an optical filter function 4 and a camera format conversion function 5.

The vehicle behavior simulator 1 calculates a behavior of a vehicle at predetermined time intervals (e.g., 1 millisecond), calculating left and right camera coordinates and attitude of the vehicle present in a simulation space. The camera coordinates and attitude to be calculated may be expressed by a relative variation between the coordinates and the attitude as determined at a given point in time, or by absolute coordinates and an absolute attitude angle based on a predetermined position and direction. The vehicle behavior is calculated by using information about operations by a driver operating an accelerator, brake or steering wheel as well as vehicle control information S10 including accelerator operation, brake operation, steering angle and the like which are inputted from the stereo camera ECU 6. The vehicle behavior simulator transmits the calculated left viewpoint coordinates and attitude S1 to the left viewpoint video generation function 2 and the calculated right viewpoint coordinates and attitude S2 to the right viewpoint video generation function 3. Further, the vehicle behavior simulator also transmits vehicle information S11 such as vehicle speed to the stereo camera ECU 6.

The left viewpoint video generation function 2 generates a left viewpoint video image S3 from the left viewpoint coordinates and attitude S1 calculated by the vehicle behavior simulator 1 and transmits the resultant video image to the optical filter function 4.

The right viewpoint video generation function 3 generates a right viewpoint video image S4 from the right viewpoint coordinates and attitude S2 calculated by the vehicle behavior simulator 1 and transmits the resultant video image to the optical filter function 4.

According to optical processing information S8 outputted from the stereo camera ECU 6, the optical filter function 4 generates optically processed left viewpoint video image S5 and right viewpoint video image S6 by optically processing the left and right viewpoint video images S3, S4 for lightness, noise and the like, and transmits the resultant video images to the camera format conversion function 5 at the timing of a shutter signal S9.

The camera format conversion function 5 converts the inputted, optically processed left viewpoint video image S5 and right viewpoint video image S6 to the CG video S7 which is compatible with a camera I/F in terms of hardware and software so as to be received by the stereo camera ECU 6.

The stereo camera ECU 6 receives inputs of the CG video S7 compatible with the camera I/F and the vehicle information S11 such as vehicle speed, and outputs to the vehicle behavior simulator 1 the vehicle control information S10 such as the accelerator operation, brake operation and steering angle on an as-needed basis. Further, the stereo camera ECU 6 outputs, to the optical filter function 4, the optical processing information S8 including exposure information and the like demanded by the stereo camera ECU 6 and the shutter signal S9 indicating the timing to demand a video image at the timing of demanding the video image. The shutter signal S9 is also outputted to the vehicle behavior simulator 1.

Hereinafter, the description will be made on the left viewpoint video image in a case where the same operation is performed for both the left viewpoint video image and the right viewpoint video image. While the description with respect to the right viewpoint video image is omitted, the same operation as that for the left viewpoint video image is performed.

Figure 2:
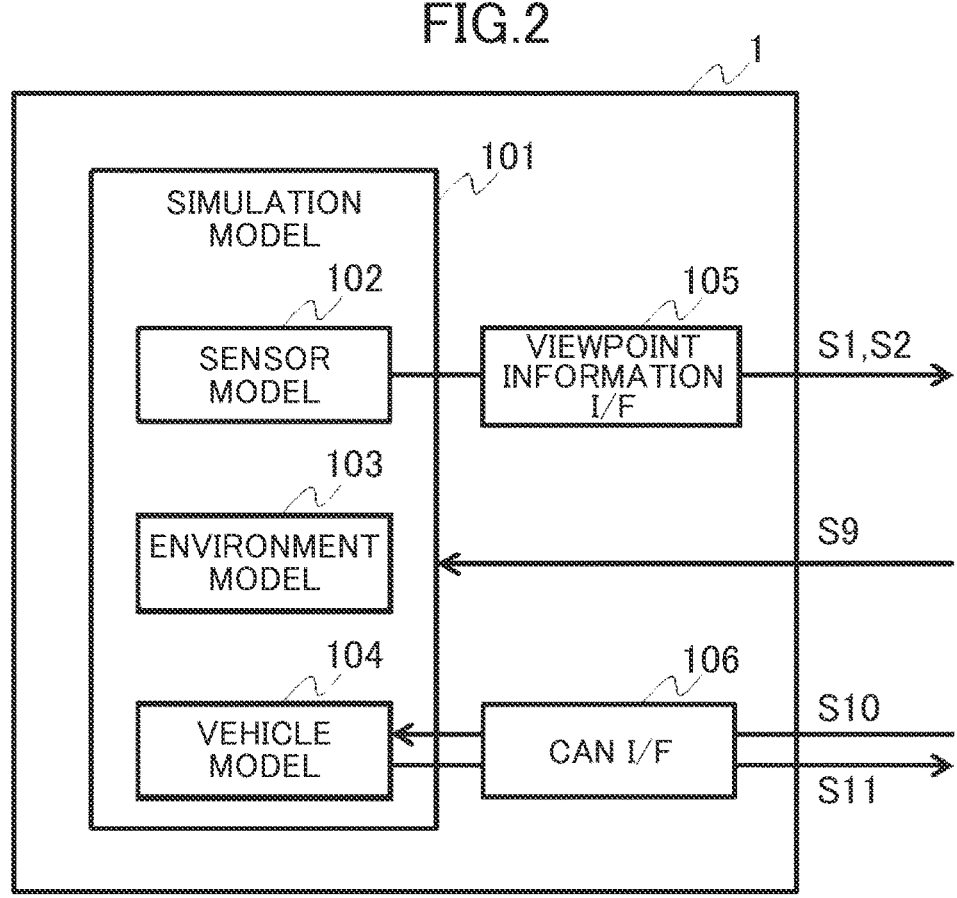
FIG. 2 is a diagram showing a configuration of a vehicle behavior simulator according to a first embodiment hereof.

FIG. 2 is a diagram showing a configuration of the vehicle behavior simulator 1 according to the embodiment.

The vehicle behavior simulator 1 includes: a simulation model 101, a viewpoint information I/F 105 and a CAN I/F 106. The simulation model 101 includes a sensor model 102, an environment model 103, and a vehicle model 104.

The simulation model 101 calculates the behavior (e.g., location and attitude) of the vehicle at predetermined time intervals (e.g., 1 millisecond), and outputs the calculated left and right viewpoint coordinates and attitudes S1, S2 at the timing of the shutter signal S9. The vehicle model 104 travels on a virtual road belonging to the environment model 103 so as to allow the simulation model to calculate a vehicle behavior equivalent to that of a real vehicle. The vehicle model 104 acquires the vehicle control information S10 such as the accelerator operation, brake operation and steering angle as inputted from the stereo camera ECU 6 via the CAN I/F 106 and reflects the information on the vehicle behavior. Vehicle information S11 simulated by the vehicle model 104 is converted by the CAN I/F 106 and is transmitted to the stereo camera ECU 6.

The sensor model 102 configures the settings for an outside view recognition sensor mounted on a vehicle simulated by the vehicle model 104. According to the embodiment, a mounting position of the stereo camera mounted to the vehicle is set. The settings for the outside view recognition sensor are used for the calculations of the left and right viewpoint coordinates and attitudes S1, S2. The calculated left and right viewpoint coordinates and attitudes S1, S2 are transmitted to the respective viewpoint video generation functions 2, 3 via the viewpoint information I/F 105.

Here, the description is made on a physical structure of a calculator constituting the evaluation environment according to the embodiment.

The evaluation environment of the embodiment is constituted by a calculator including a processor (CPU), a memory, an auxiliary storage device and a communications interface. The evaluation environment may also include an input interface and an output interface.

The processor is an arithmetic device for executing a program stored in the memory. The functions of the individual components of the evaluation environment (such as the vehicle behavior simulator 1, the left viewpoint video generation function 2, the right viewpoint video generation function 3, the optical filter function 4 and the camera format conversion function 5) are implemented by the processor executing the programs. It is noted that a part of the processing performed by the processor executing the program may also be implemented by some other arithmetic device (exemplified by hardware such as ASIC and FPGA).

The memory includes ROM as a nonvolatile memory element and RAM as a volatile memory element. The ROM stores fixed programs (such as BIOS) and the like. The RAM is a fast and volatile memory element such as DRAM (Dynamic Random Access Memory), which temporarily stores a program executed by the processor and data used during the execution of the program.

The auxiliary storage device is a mass and nonvolatile storage device such as magnetic storage device (HDD) and flash memory (SSD). Further, the auxiliary storage device stores data used when the processor executes a program, and the program executed by the processor. Specifically, the program is read out from the auxiliary storage device, loaded into the memory and executed by the processor so that the individual functions of the evaluation environment are implemented.

The communications interface is a network interface device which controls communications with other devices according to a predetermined protocol.

The input interface is connected with an input device such as a keyboard and a mouse and receives an input from an operator. The output interface is connected with an output device such as a display device and a printer (not shown) and outputs an execution results of a program in a viewable form for the operator. Incidentally, a user terminal connected to the evaluation environment via the network may also be used as the input device and the output device. In this case, the evaluation environment may function as a web server, while the user terminal may access the evaluation environment according to a predetermined protocol.

The program executed by the processor is supplied to the evaluation environment via a removable media (such as CD-ROM and flash memory) or via a network, and is stored in a nonvolatile auxiliary storage device as a non-temporary storage medium. Accordingly, the evaluation environment may preferably include an interface for retrieving data from a removable medium.

The evaluation environment is a computer system physically constructed on one computer or constructed on a plurality of logically or physically configured computers. The evaluation environment may also operate on a virtual computer constructed on a plurality of physical computer resources. For example, the vehicle behavior simulator 1, the left viewpoint video generation function 2, the right viewpoint video generation function 3, the optical filter function 4 and the camera format conversion function 5 may respectively operate on different physical or logical computers. Otherwise, two or more of the above simulator and functions may be combined together to operate on one physical or logical computer.

Figure 3:
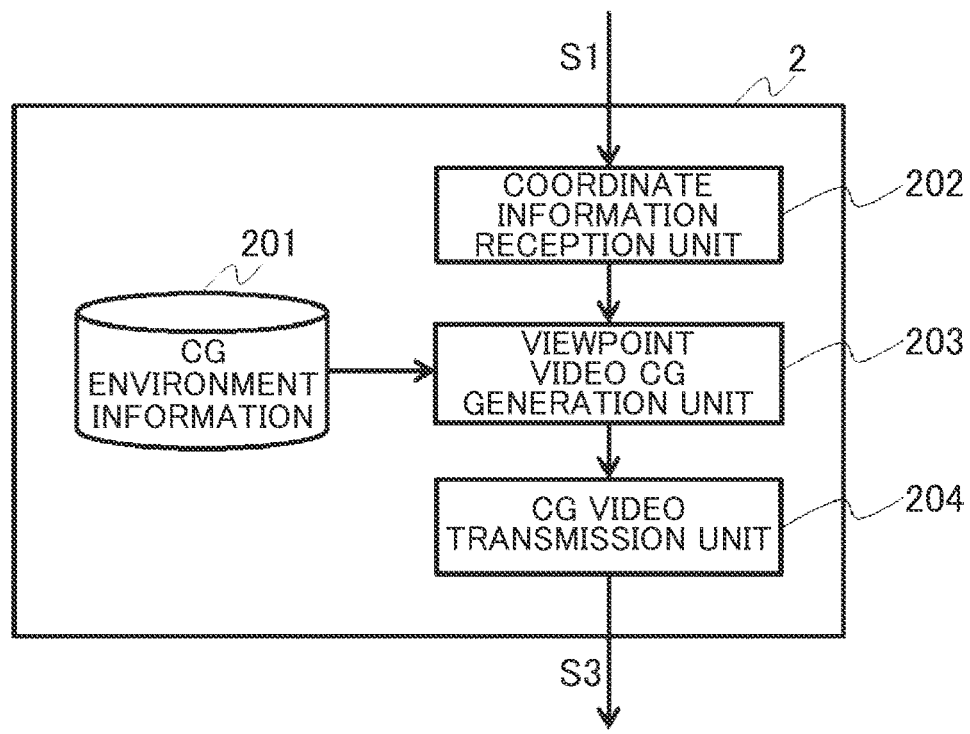
FIG. 3 is a diagram showing a configuration of a viewpoint video generation function according to the first embodiment hereof.

FIG. 3 is a diagram showing a configuration of the viewpoint video generation function 2, 3 according to the embodiment. While FIG. 3 shows the configuration of the left viewpoint video generation function 2, the right viewpoint video generation function 3 is configured the same way.

The left viewpoint video generation unit 2 includes CG environment information 201, a coordinate information reception unit 202, a viewpoint video CG generation unit 203 and a CG video transmission unit 204. The coordinate information reception unit 202 converts the viewpoint coordinates and attitude S1 calculated by the vehicle behavior simulator 1 into data in a format which is compatible with the viewpoint video CG generation unit 203 and transmits the resultant data to the viewpoint video CG generation unit 203.

In a virtual space specified by the CG environment information 201, the viewpoint video CG generation unit 203 generates a CG video according to the viewpoint coordinates and attitude S1 converted by the coordinate information reception unit 202 and transmits the resultant video to the CG video transmission unit 204.

Receiving the video generated by the viewpoint video CG generation unit 203, the CG video transmission unit 204 immediately transmits the left viewpoint video image S3 to the optical filter function 4. The CG video transmission unit 204 may also include a buffer to store the video.

Figure 4:
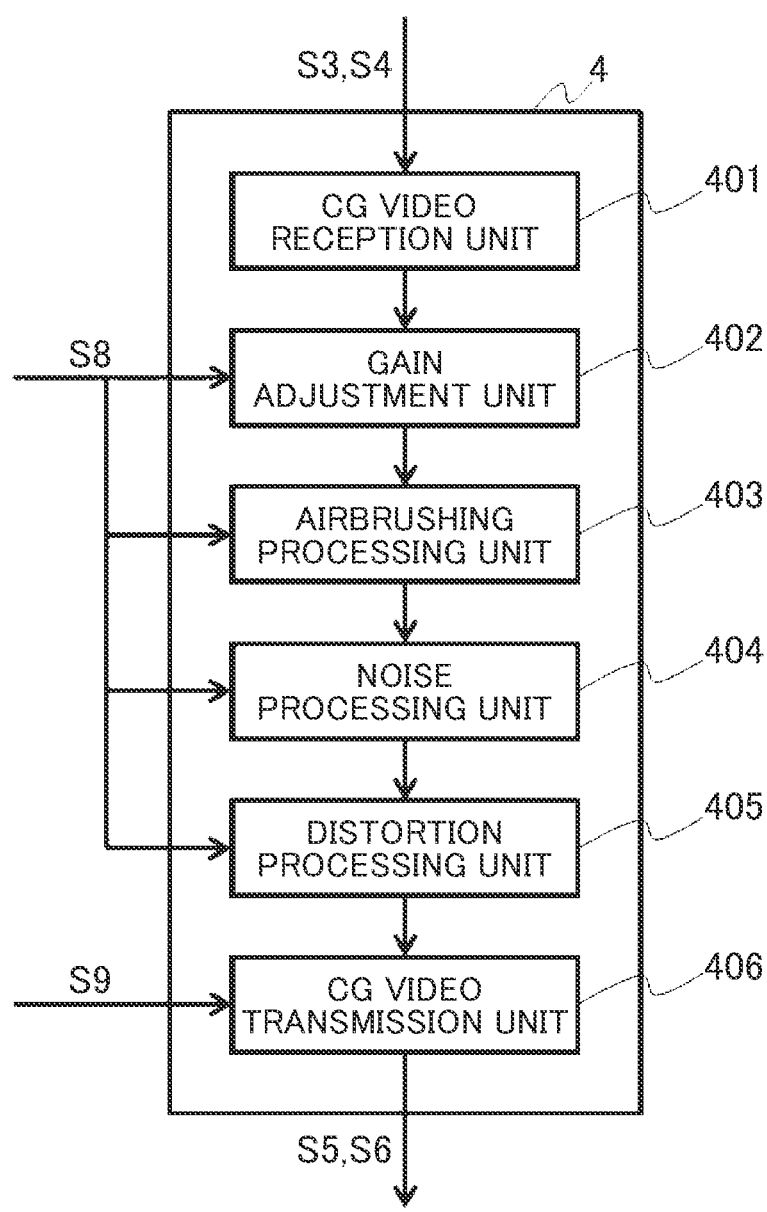
FIG. 4 is a diagram showing a configuration of an optical filter function according to the first embodiment hereof.

FIG. 4 is a diagram showing a configuration of the optical filter function 4 according to the embodiment.

The optical filter function 4 includes a CG video reception unit 401, a gain adjustment unit 402, an airbrushing processing unit 403, a noise processing unit 404, a distortion processing unit 405 and a CG video transmission unit 406. The CG video reception unit 401 receives the left viewpoint video image S3 or the right viewpoint video image S4 and transmits the viewpoint video image to the gain adjustment unit 402, the airbrushing processing unit 403, the noise processing unit 404, and the distortion processing unit 405. The CG video reception unit 401 may also include a buffer to store the received video image. The optical filter function 4 may also be configured to arbitrarily change the order of the gain adjustment unit 402, the airbrushing processing unit 403, the noise processing unit 404, and the distortion processing unit 405.

The gain adjustment unit 402, the airbrushing processing unit 403, the noise processing unit 404, and the distortion processing unit 405 perform a processing of simulating an optical system of the camera based on the optical processing information S8 inputted from the stereo camera ECU 6. One or more of these processing operations may selectively be performed according to a characteristic of the simulated optical system (lens and imaging device). Specifically, the gain adjustment unit 402 performs a processing of simulating the lightness of the video image by making gain adjustment of the imaging device of the camera. The airbrushing processing unit 403 performs a processing of simulating optical blurring intrinsic to the lens. The noise processing unit 404 performs a processing of simulating noises contained in a video image captured by the camera. The distortion processing unit 405 performs a processing of simulating optical distortion intrinsic to the lens.

Subsequently, the optical filter function 4 stores the optically processed viewpoint video images in the CG video transmission unit 406 and transmits the left and right viewpoint video images S5, S6 to the camera format conversion function 5 at the timing of the shutter signal S9. The CG video transmission unit 406 may also include a buffer to store the video.

Figure 5:
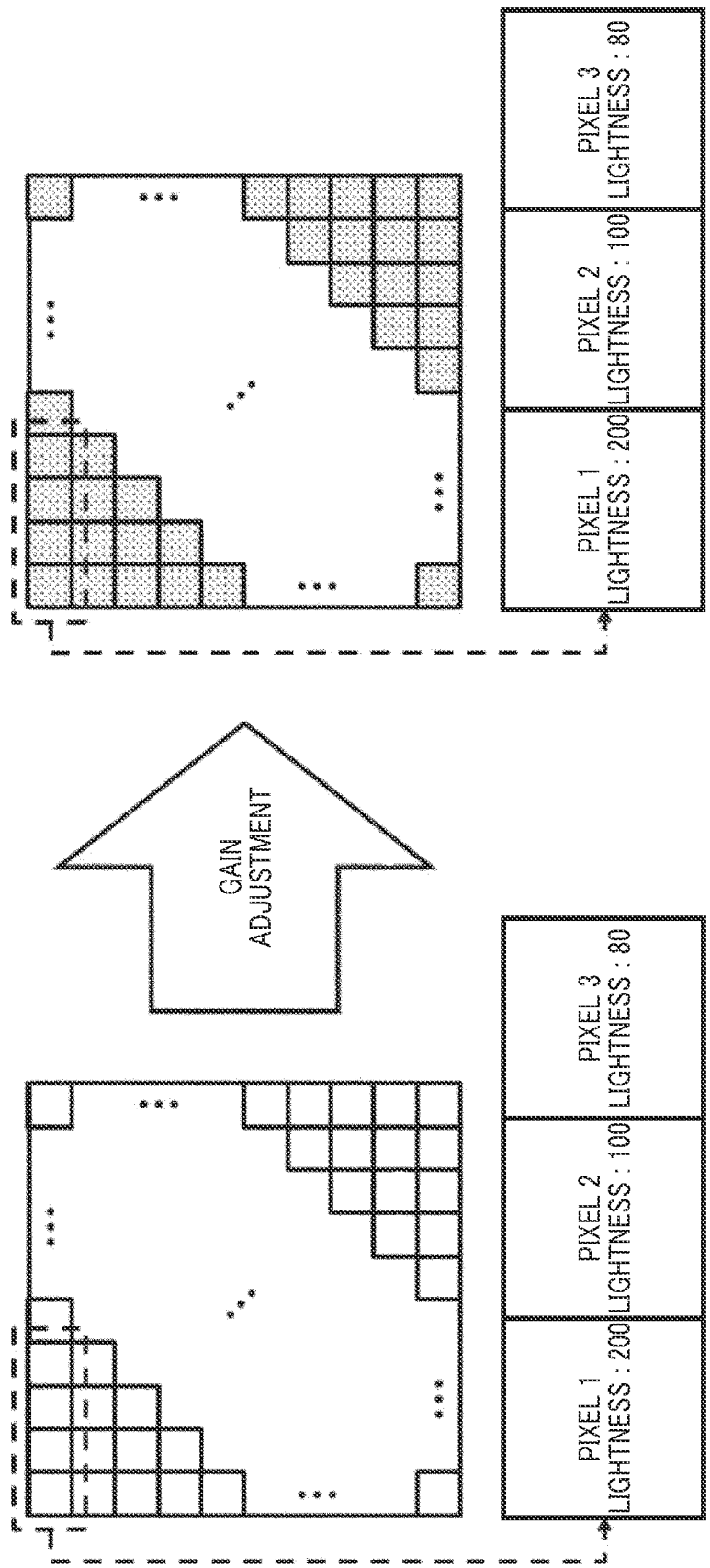
FIG. 5 is a conceptual diagram of a gain adjustment unit according to the first embodiment hereof.

FIG. 5 is a conceptual diagram of the gain adjustment unit 402 according to the embodiment.

The left viewpoint video image S3 generated by the left viewpoint video generation function 2 is composed of sets of plural pixels. In a case where each pixel is expressed as three separate RGB values, for example, the separate RGB values respectively contain lightness information. Hence, each of the RGB values is determined. The stereo camera ECU 6, which has adjusted the exposure time of the camera according to the level of ambient light, outputs the optical processing information S8. In a case where the exposure information contained in the optical processing information S8 indicates a command to set the lightness of the individual pixels to ½, the gain adjustment unit performs a processing of setting the lightness of each pixel to ½. Thus is generated a video image equivalent to an image actually captured by the imaging device through the optical system such as lens.

Figure 6:
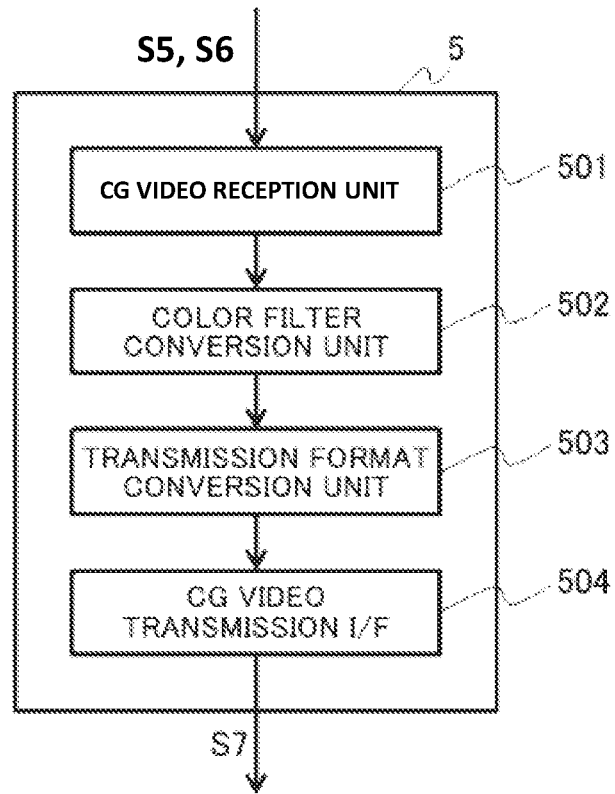
FIG. 6 is a diagram showing a configuration of a camera format conversion function according to the first embodiment hereof.

FIG. 6 is a diagram showing a configuration of the camera format conversion function 5 according to the embodiment.

The camera format conversion function 5 is an interface for connecting the left and right viewpoint video images S5, S6 as data information with the hardware, and includes a CG video reception unit 501, a color filter conversion unit 502, a transmission format conversion unit 503 and a CG video transmission I/F 504.

The CG video reception unit 501 receives the left and right viewpoint video images S5, S6 optically processed by the optical filter function 4, and transmits the video images to the color filter conversion unit 502 for color pattern conversion to RGB format or RCC format compatible with the camera ECU.

The color filter conversion unit 502 transmits the CG video image converted into the color pattern compatible with the stereo camera ECU 6 (such as the same format as that of the video image outputted from the imaging device) to the transmission format conversion unit 503 which converts the CG video into a video format compatible with a camera-bound transmission I/F.

The CG video transmission I/F 504 outputs, to the stereo camera ECU 6, the CG video S7 converted by the transmission format conversion unit 503 into the format conforming to the camera format.

Figure 7:
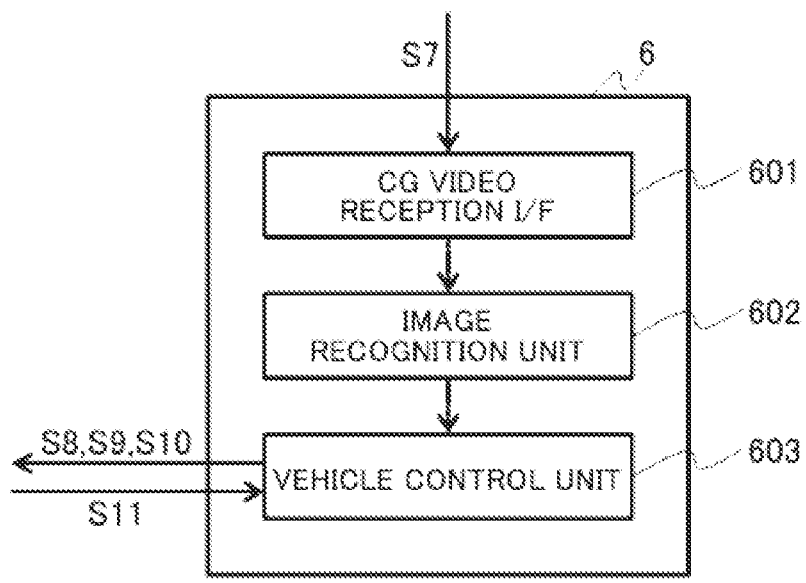
FIG. 7 is a diagram showing a configuration of a stereo camera ECU according to the first embodiment hereof.

FIG. 7 is a diagram showing a configuration of the stereo camera ECU 6 according to the embodiment.

The stereo camera ECU 6 includes: a CG video reception I/F 601, an image recognition unit 602, and a vehicle control unit 603.

The CG video reception I/F 601 receives the inputted CG video image in the camera format and transmits the CG video image to the image recognition unit 602.

The image recognition unit 602 performs an outside view recognition processing using the inputted CG video image and outputs recognition results such as speed and travelled distance of a recognized object.

The vehicle control unit 603 outputs the vehicle control information S10. The vehicle control information S10 includes the accelerator operation, brake operation, steering angle and the like which are control feedback information for vehicle control. The control feedback information is generated based on the recognition results given by the image recognition unit 602 and the vehicle information S11. The vehicle control unit 603 outputs the optical processing information S8, demanded by the stereo camera ECU 6, such as the exposure time deciding the lightness of the video image, and the shutter signal S9 indicating the timing for the stereo camera ECU 6 to demand the video image.

Figure 8:
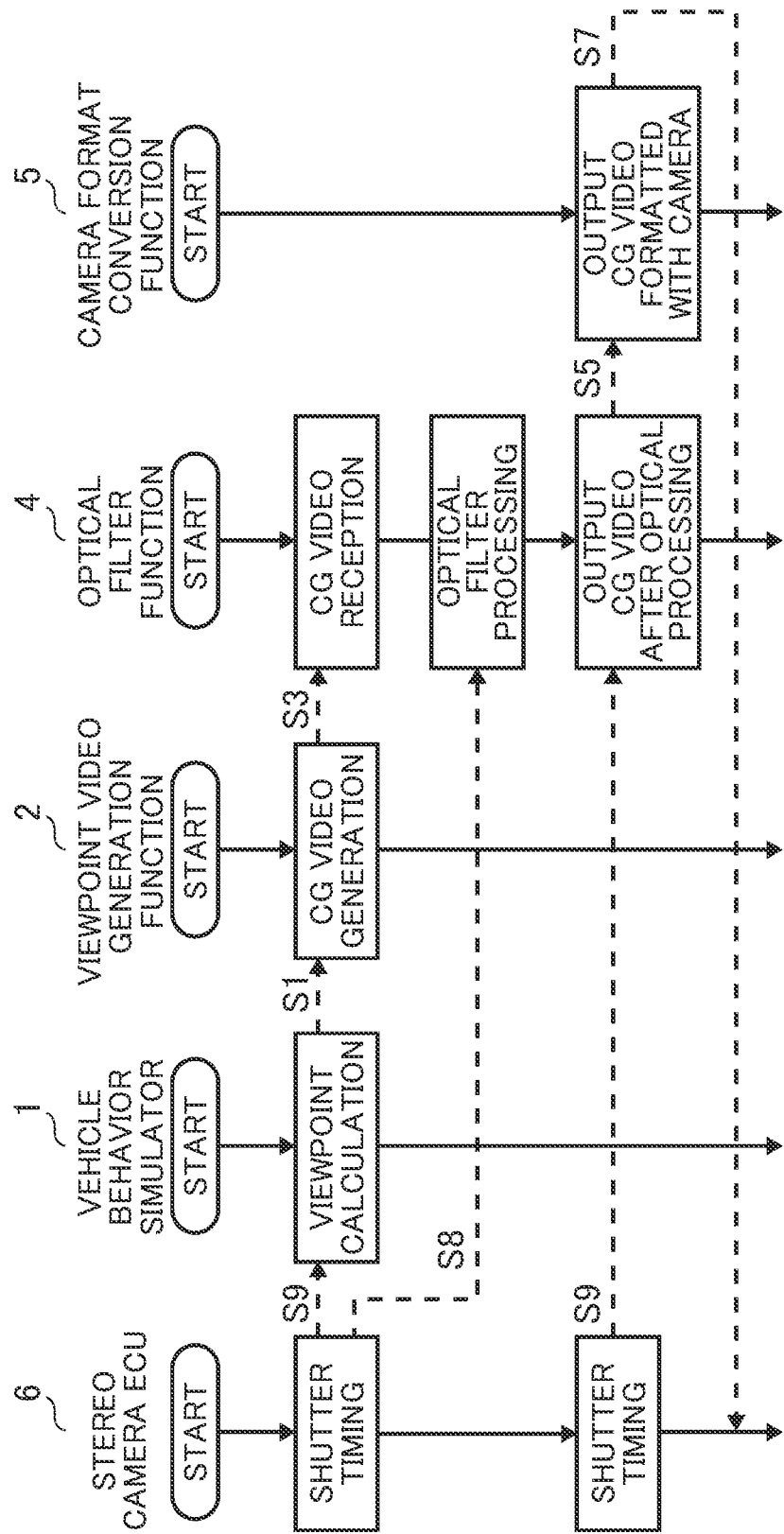
FIG. 8 is a sequence diagram showing operations of individual functions constituting the HILS according to the first embodiment hereof.

FIG. 8 is a sequence diagram showing operations of individual functions constituting the HILS according to the embodiment. While FIG. 8 shows a processing of generating the left viewpoint video image, the right viewpoint video image is also generated by the same processing.

Each timing of demanding the video image, the stereo camera ECU 6 transmits the shutter signal S9 and the optical processing information S8. When receiving the shutter signal S9, the vehicle behavior simulator 1 calculates the camera viewpoint coordinates and attitude S1 at the timing of signal reception and informs the viewpoint video generation functions 2, 3 of the reception. When informed of the camera viewpoint coordinates and attitude S1, the viewpoint video generation function 2, 3 generate the CG video image S3 of the informed camera viewpoint coordinates and attitude S1 and transmits the CG video image to the optical filter function 4. According to the optical processing information S8 received from the stereo camera ECU 6, the optical filter function 4 performs an optical image processing on the received CG video image so as to provide an output to the stereo camera ECU 6 and holds the processed video image. At the timing for the stereo camera ECU 6 to demand the next shutter signal S9, the optical filter function 4 transmits the optically processed video image S5 to the camera format conversion function 5 for conversion into a signal format compatible with the stereo camera ECU 6. The camera format conversion function 5 converts the optically processed video image S5 so received into a camera format compatible with the stereo camera ECU and transmits the resultant video image to the stereo camera ECU 6.

A CG video by the optical processing producing no misregistration between the left and right viewpoint video images can be provided by finishing processing of the left and right camera images within a shutter timing and transmitting the data at the next shutter timing.

According to the first embodiment as described above, the evaluation apparatus includes: the video generation function 2, 3 which generates the simulation video image simulating the outside view video image captured by the camera; the optical filter function 4 which performs the optical image processing on the simulation video image in order to simulate the video image outputted from the camera; and the camera image processing unit (stereo camera ECU 6, stereo camera model 7) which performs the recognition processing using the processed video image in order to generate the vehicle control signal. Hence, the evaluation apparatus can properly evaluate the camera image processing unit by using a virtual video image subjected to the optical image processing for lightness and distortion required by the evaluation object.

If the CG video image changed in the lightness based on the information from the stereo camera ECU 6 is drawn, load on the system increases. Therefore, the optical filter function 4 performs the optical image processing on the simulation video image generated by the video generation functions 2, 3 so that the simulation video image conforming to the requirement from the stereo camera ECU 6 can be generated while reducing the system load.

The operations of the stereo camera ECU may sometimes vary depending upon the lightness. At the time of learning by the stereo camera ECU 6, it is effective to use video images of the same object which differ only in the lightness. However, live video images or CG video images generated under specified conditions have only one level of lightness. This makes it difficult for the ECU to learn at different levels of lightness. According to the embodiment, however, video images are generated in the CG environment so that video images of the same object can be generated under different conditions. This permits the stereo camera ECU 6 to learn adequately based on more detailed lightness specifications than the lightness conditions of live video images.

Further, the embodiment has the vehicle behavior simulator 1 which simulates the behavior of the vehicle equipped with the camera and its ambient environment, while the video generation functions 2, 3 generate the CG video images based on the output from the vehicle behavior simulator 1. Hence, a CG video conforming to the vehicle travel can be generated.

The apparatus includes the camera format conversion function 5 which converts the data format of the video image processed by the optical filter function 4 to that suited to be inputted to the stereo camera ECU 6. Therefore, when the evaluation apparatus is installed in a real vehicle, the video data in the format compatible with the stereo camera ECU 6 (e.g., RGB pixel data outputted by the imaging device) can be inputted in the stereo camera ECU 6 so that the stereo camara ECU 6 can be evaluated properly.

According to the first embodiment, the camera is a compound eye camera which captures at least the left viewpoint video image and the right viewpoint video image. On the other hand, a camera according to a fourth embodiment is a monocular camera which captures a single video. The invention is also adapted to different numbers of cameras (imaging devices).

The optical filter function 4 performs at least one of the gain adjustment processing, the airbrushing processing, the noise processing and the distortion processing. Therefore, the embodiment can generate a video image equivalent to that captured by the imaging device via the optical system such as real lenses.

Second Embodiment

Figure 9:
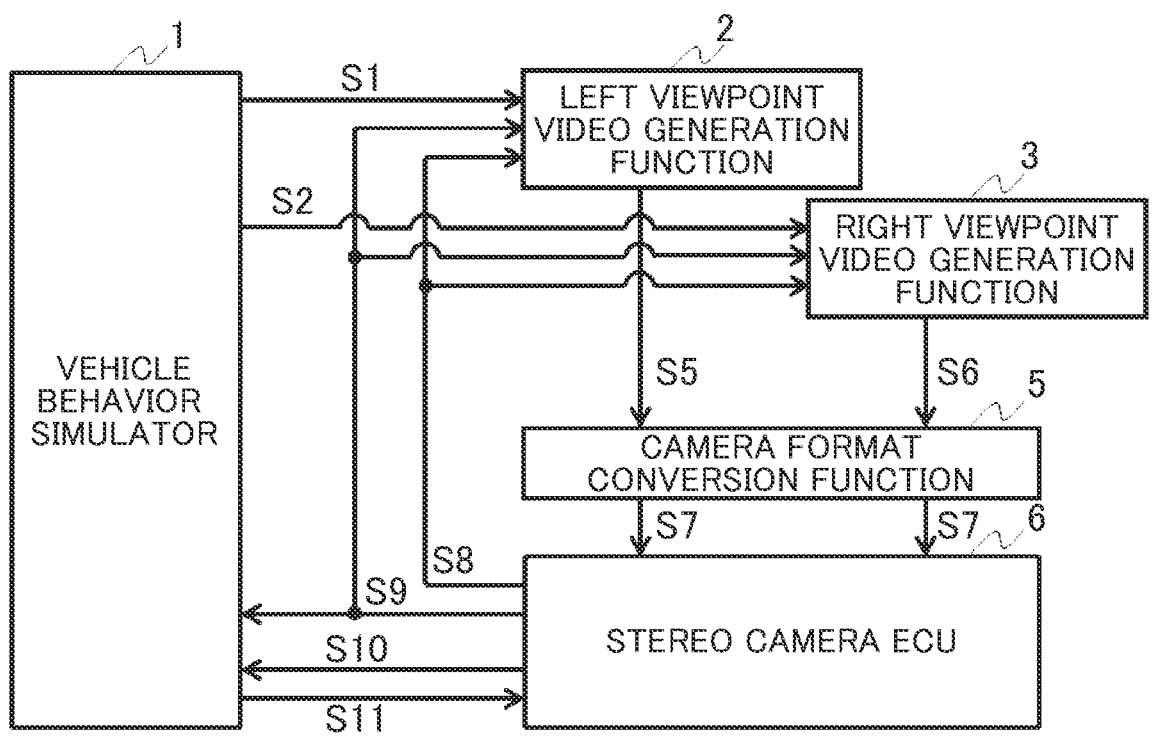
FIG. 9 is a diagram showing an exemplary configuration of HILS where an optical filter function according to a second embodiment hereof is incorporated into a video generation function.

FIG. 9 is a diagram showing an exemplary configuration of HILS where the optical filter function 4 is incorporated into a video generation function according to one embodiment hereof. According to a second embodiment, the left viewpoint video generation function 2 and the right viewpoint video generation function 3 perform the optical image processing when generating the CG video. In the following description of the second embodiment, differences from the first embodiment are principally described. Like reference numerals refer to the corresponding functional components of the first embodiment and the description thereof is dispensed with.

An evaluation environment for evaluation of the stereo camera ECU 6 to which the CG video S7 is inputted includes: the vehicle behavior simulator 1, the left viewpoint video generation function 2, the right viewpoint video generation function 3 and the camera format conversion function 5.

The vehicle behavior simulator 1 calculates the behavior of the vehicle at predetermined time intervals (e.g., 1 millisecond), calculating the left and right camera coordinates and attitude of the vehicle present in the simulation space. The vehicle behavior is calculated by using the information about the operations by the driver as well as the vehicle control information S10 including the accelerator operation, the brake operation, the steering angle and the like which are inputted by the stereo camera ECU 6. The vehicle behavior simulator transmits the calculated left viewpoint coordinates and attitude S1 to the left viewpoint video generation function 2 and the calculated right viewpoint coordinates and attitude S2 to the right viewpoint video generation function 3. Further, the vehicle behavior simulator transmits the vehicle information S11 such as vehicle speed to the stereo camera ECU 6.

The left viewpoint video generation function 2 generates an optically processed left viewpoint video image S5 from the left viewpoint coordinates and attitude S1 calculated by the vehicle behavior simulator 1 and the optical processing information S8 outputted from the stereo camera ECU 6, and transmits the video image to the camera format conversion function 5 at the timing of input of the shutter signal S9.

The right viewpoint video generation function 3 generates an optically processed right viewpoint video image S6 from the right viewpoint coordinates and attitude S2 calculated by the vehicle behavior simulator 1 and the optical processing information S8 outputted from the stereo camera ECU 6, and transmits the video image to the camera format conversion function 5 at the timing of input of the shutter signal S9.

The camera format conversion function 5 converts the optically processed and inputted left viewpoint video image S5 and right viewpoint video image S6 to the CG video S7 which is compatible with a camera I/F in terms of hardware and software so as to be received by the stereo camera ECU 6.

The stereo camera ECU 6 receives inputs of the CG video S7 compatible with the camera I/F and the vehicle information S11 such as vehicle speed, and outputs the vehicle control information S10 such as the accelerator operation, brake operation and steering angle to the vehicle behavior simulator 1 on an as-needed basis. Further, the stereo camera ECU 6 outputs the optical processing information S8 including the exposure information and the like demanded by the stereo camera ECU 6 to the left viewpoint video generation function 2 and the right viewpoint video generation function 3. Furthermore, the stereo camera ECU 6 controls the timing to demand the video image, outputting the shutter signal S9 indicating the timing of demanding a video image to the left viewpoint video generation function 2, the right viewpoint video generation function 3 and the vehicle behavior simulator 1.

Hereinafter, the description is made on the left video image in a case where the same operation is performed for both the left and right video images. The same processing as that for the left video image is performed for the right video image, the description of which is dispensed with.

Figure 10:
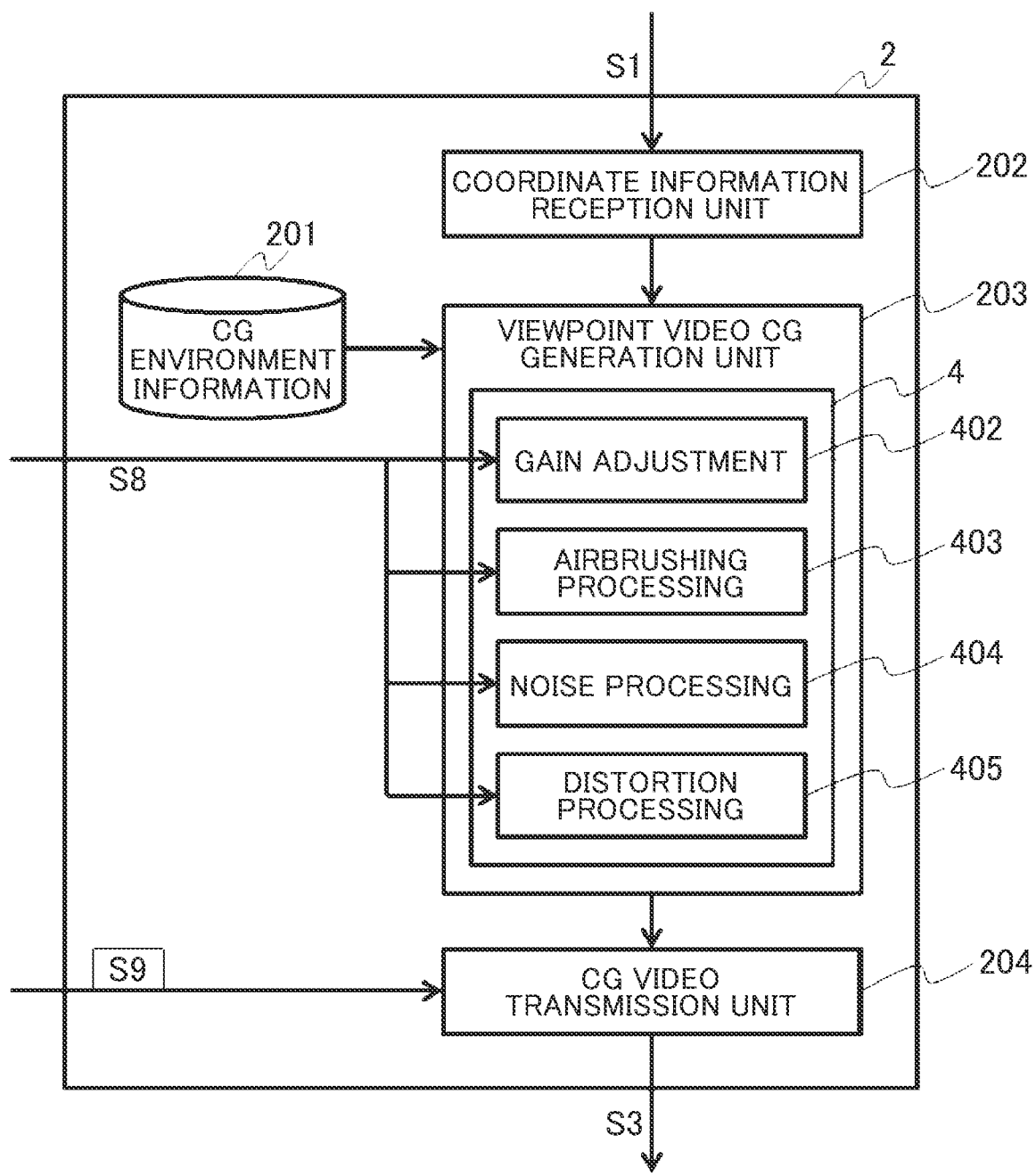
FIG. 10 is a diagram showing a configuration of a viewpoint video generation function including the optical filter function according to the second embodiment hereof.

FIG. 10 is a diagram showing a configuration of a viewpoint video generation function 2, 3 including the optical filter function 4 according to the embodiment. While FIG. 10 shows the configuration of the left viewpoint video generation function 2, the right viewpoint video generation function 3 has the same configuration, too.

The left viewpoint video generation function 2 includes: the CG environment information 201, the coordinate information reception unit 202, the viewpoint video CG generation unit 203 and the CG video transmission unit 204. The viewpoint video CG generation unit 203 includes the optical filter function 4. The viewpoint video CG generation unit 203 includes the optical filter function 4 and generates the CG video by performing the image processing by means of the gain adjustment unit 402, the airbrushing processing unit 403, the noise processing unit 404, and the distortion processing unit 405.

When receiving the viewpoint coordinates and attitude S1 calculated by the vehicle behavior simulator 1, the coordinate information reception unit 202 transmits the calculated viewpoint coordinate and attitude to the viewpoint video CG generation unit 203.

In a virtual space specified by the CG environment information 201, the viewpoint video CG generation unit 203 generates a CG video according to the viewpoint coordinates and attitude S1 converted by the coordinate information reception unit 202. Based on the optical processing information S8 inputted by the stereo camera ECU 6, the viewpoint video CG generation unit 203 generates the optically processed video image by performing the processing by means of the gain adjustment unit 402, the airbrushing processing unit 403, the noise processing unit 404 and the distortion processing unit 405, and transmits the video image to the CG video transmission unit 204. The CG video transmission unit 204 may also include a buffer to store the video image.

At the timing of input of the shutter signal S9 from the stereo camera ECU 6, the CG video transmission unit 204 transmits the optically processed left viewpoint video image S5 to the camera format conversion function 5.

Figure 11:
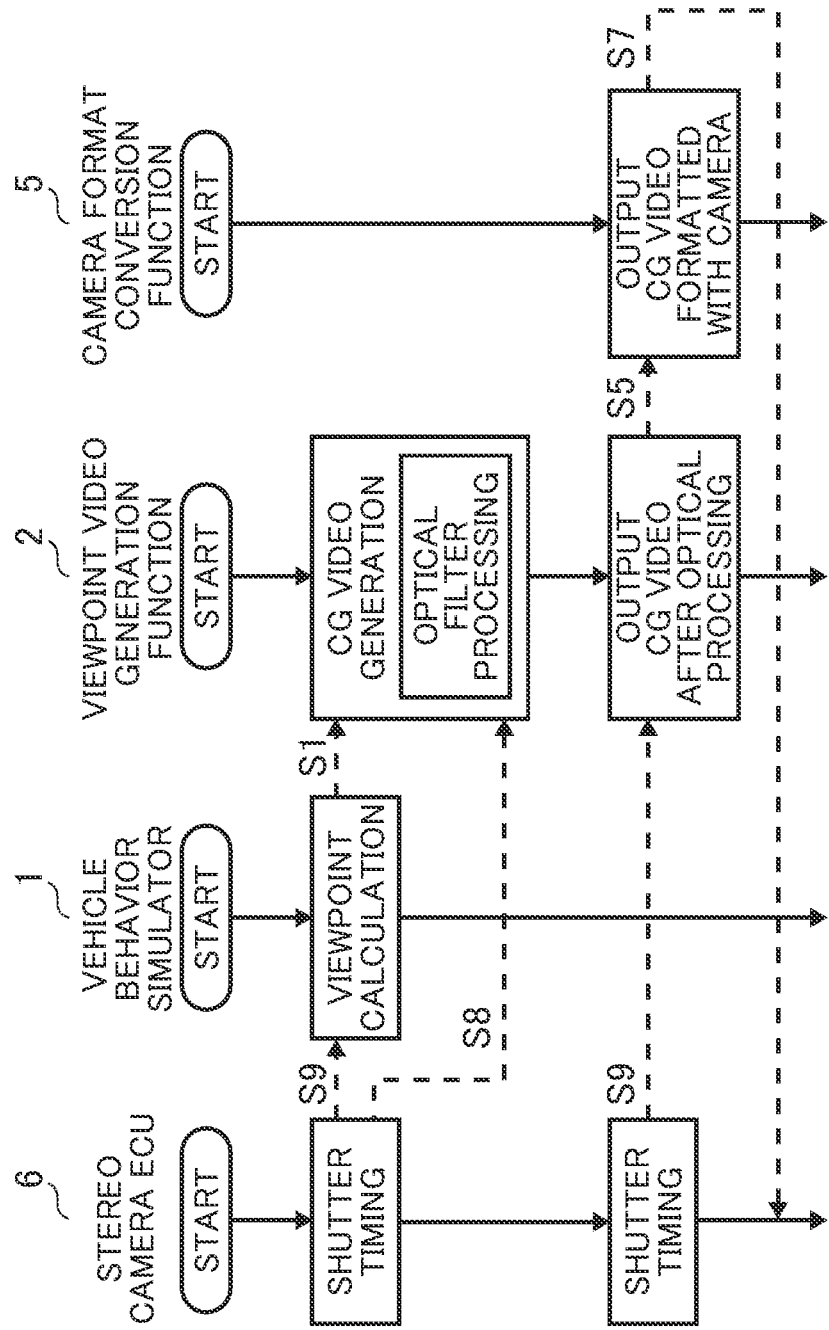
FIG. 11 is a sequence diagram showing operations of individual functions constituting the HILS according to the second embodiment hereof.

FIG. 11 is a sequence diagram showing operations of the individual functions constituting the HILS according to the embodiment.

The stereo camera ECU 6 transmits the shutter signal S9 and the optical processing information S8 at each timing of demand for the video image. When receiving the shutter signal S9, the vehicle behavior simulator 1 calculates the camera viewpoint coordinates and attitude S1 at the time of signal reception and transmits the calculation result to the viewpoint video generation function 2, 3. When notified of the camera viewpoint coordinates and attitude S1, the viewpoint video generation function 2, 3 generates a CG video image of the notified camera viewpoint coordinates and attitude S1. According to the optical processing information S8 received from the stereo camera ECU 6, the viewpoint video generation function performs the optical image processing on the received CG video image S3 in order to generate the CG video image S5 to be outputted to the stereo camera ECU 6. The generated video image is retained by the viewpoint video generation function 2, 3. At the timing for the stereo camera ECU 6 to demand via the next shutter signal S9, the viewpoint video generation function 2, 3 transmits the optically processed video image S5 to the camera format conversion function 5 for conversion into a signal format compatible with the stereo camera ECU 6. The camera format conversion function 5 converts the optically processed video image S5 so received into the camera format and transmits the resultant video image to the stereo camera ECU 6.

According to the second embodiment as described above, a processing time for the CG video generation is longer than that of the first embodiment because of the optical filter function 4 disposed in the video generation function 2, 3. However, the number of processes related to the video generation such as input/output information to/from the buffer and data transfer can be reduced. Therefore, the stereo camera ECU 6 can be evaluated more quickly.

Third Embodiment

Figure 12:
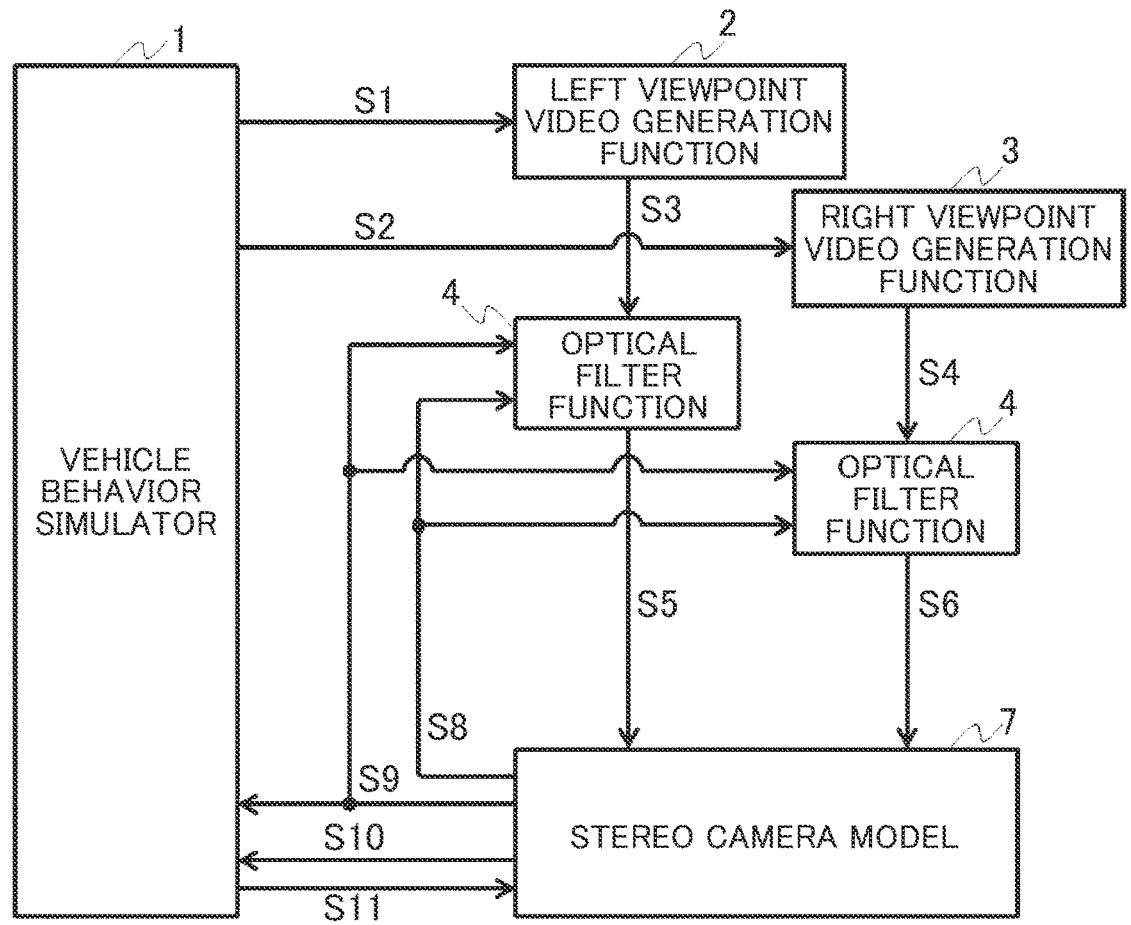
FIG. 12 is a diagram showing an exemplary configuration of SILS using an optical filter function according to a third embodiment hereof.

FIG. 12 is a diagram showing an exemplary configuration of SILS using an optical filter function 4 according to a third embodiment hereof. According to the third embodiment, the function of the stereo camera ECU 6 of the first embodiment is implemented by a stereo camera model 7 constituted by software so that data inputted to the stereo camera model 7 need not be converted in format. This negates the need for the camera format conversion function 5. In the following description of the third embodiment, differences from the first embodiment are principally described. Like reference numerals refer to the corresponding functional components of the first embodiment and the description thereof is dispensed with.

An evaluation environment for evaluation of the stereo camera model 7 to which the CG video S7 is inputted includes: the vehicle behavior simulator 1, the left viewpoint video generation function 2, the right viewpoint video generation function 3 and the optical filter function 4.

The vehicle behavior simulator 1 calculates the behavior of the vehicle at predetermined time intervals (e.g., 1 millisecond), calculating the left and right camera coordinates and attitude of the vehicle present in the simulation space. The vehicle behavior is calculated by using the information about the operations by the driver as well as the vehicle control information S10 including accelerator operation, brake operation, steering angle and the like which are inputted from the stereo camera ECU 6. The vehicle behavior simulator transmits the calculated left viewpoint coordinates and attitude S1 to the left viewpoint video generation function 2 and the calculated right viewpoint coordinates and attitude S2 to the right viewpoint video generation function 3. Further, the vehicle behavior simulator also transmits the vehicle information S11 such as vehicle speed to the stereo camera ECU 6.

The left viewpoint video generation function 2 generates the left viewpoint video image S3 from the left viewpoint coordinates and attitude S1 calculated by the vehicle behavior simulator 1 and transmits the video image to the optical filter function 4.

The right viewpoint video generation function 3 generates a right viewpoint video image S4 from the right viewpoint coordinates and attitude S2 calculated by the vehicle behavior simulator 1 and transmits the video image to the optical filter function 4.

The optical filter function 4 generates the left viewpoint video image S5 and right viewpoint video image S6 by optically processing the left and right viewpoint video images S3, S4 for lightness, noise and the like according to the optical processing information S8 outputted from the stereo camera ECU 6, and transmits the video images S5, S6 to the camera format conversion function 5 at the timing of a shutter signal S9.

The stereo camera model 7 receives the optically processed left and right viewpoint images S5, S6 and the vehicle information S11 such as vehicle speed, and outputs to the vehicle behavior simulator 1 the vehicle control information S10 such as the accelerator operation, brake operation and steering angle on an as-needed basis. Further, the stereo camera model 7 outputs the optical processing information S8 including exposure information and the like demanded by the stereo camera ECU 6 and the shutter signal S9 indicating the timing to demand a video image to the optical filter function 4 at the timing of demanding the video image. The shutter signal S9 is also outputted to the vehicle behavior simulator 1.

That is, the configuration to simulate the stereo camera as one of the outside view recognition sensors may be constituted by the hardware (HiLS) as illustrated by the first and second embodiments or may be constituted by the software (SiLS) as illustrated by the third embodiment.

According to the third embodiment as described above, the stereo camera ECU constituted by the hardware is simulated by means of the software. The control logic of the stereo camera ECU can be verified without being affected by the hardware specifications (e.g., signal level) of the stereo camera ECU.

Fourth Embodiment

Figure 13:
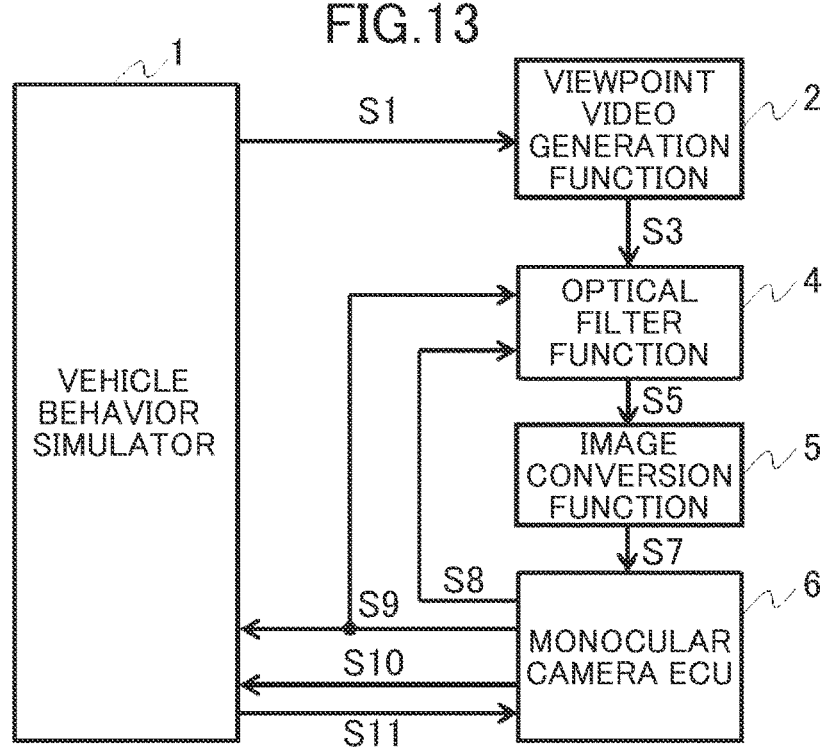
FIG. 13 is a diagram showing an exemplary configuration of HILS of a monocular camera according to a fourth embodiment hereof.

FIG. 13 is a diagram showing an exemplary configuration of HILS of a monocular camera according to a fourth embodiment. In the following description of the fourth embodiment, differences from the first embodiment are principally described. Like reference numerals refer to the corresponding functional components of the first embodiment and the description thereof is dispensed with.

An evaluation environment for evaluation of the stereo camera ECU 6 to which the CG video S7 is inputted includes: the vehicle behavior simulator 1, the viewpoint video generation function 2, the optical filter function 4 and the camera format conversion function 5. The processes of the individual functions are the same as those of the first embodiment.

The camera which is one of the outside view recognition sensors may be the compound eye camera (such as the stereo camera) as illustrated by the first to the third embodiments or may be the monocular camera as illustrated by the fourth embodiment. The invention does not limit the number of the imaging devices of the camera. The invention is also applicable to a compound eye camera having three or more eyes (a system generating an around view video image with a top-down view).

It is noted that the invention is not limited to the above-described embodiments and includes a variety of modifications and equivalent components unless otherwise such modifications and equivalent components depart from the scope of the invention. The foregoing embodiments, for example, are the detailed illustrations to clarify the invention. The invention is not necessarily limited to those including all the components described above. Some component of one embodiment can be replaced by some component of another embodiment. Further, some component of one embodiment can be added to the arrangement of another embodiment. A part of the arrangement of each embodiment permits addition of some component of another embodiment, the omission thereof or replacement thereof.

Some or all of the above-described components, functions, processing units, processing means and the like can be implemented by hardware or for example by designing particular integrated circuits. Otherwise, the above-described components, functions, processing units, processing means and the like can be implemented by software which interprets and executes programs for the processor to achieve the individual functions.

Information including programs, tables, files and the like for implementing the individual functions can be stored in storage medium such as memory, hard disk and SSD (Solid State Drive) or in a recording medium such as IC card, SD card, and DVD.

The drawings show only the control lines and information lines that are thought to be necessary for explanation purpose but do not necessarily show all the control lines and information lines that are required for implementation purpose. In reality, it can be considered that almost all components are interconnected.

Fifth Embodiment

FIG. 14 shows a viewpoint video CG video unit as an example of an embodiment. According to the embodiment, in a case where a CG video image is generated with light through real lenses, an RGB video image is drawn using light from a light source present in the virtual space. Information of light from the light source includes brightness which is included in the optical processing information S8. Color depth exists in the generated RGB video image which has a plurality of color information pieces. The color depth can be set at will and expressed as Xbit. The color depth information is associated with the brightness information. The brightness information and the color depth information can be set at will. It is also possible to make reference to one-dimensional or two-dimensional argument.

FIG. 15 shows a gain adjustment processing unit 402 for optically processing the CG video. The unit receives the RGB data shown in FIG. 14 and performs an optical processing just as that performed by a real camera taking a CMOS characteristic into consideration. The gain adjustment processing unit 402 receives the RGB data to make the gain adjustment taking the CMOS characteristic and the like into consideration. The gain adjustment also permits reference to the one-dimensional or two-dimensional argument. Thus, the adjustment unit reproduces the real CMOS characteristic.

According to the embodiment, the video generation unit generates arbitrary video data based on the brightness information outputted from the camera image processing unit.

Further, the video data is generated by converting the brightness information using an arbitrary assignable variable.

Further, the video data generated by the video generation unit is converted to video data simulating the optical sensor.

Further, the video data generated by the video generation unit is converted to the video data simulating the optical sensor by using an arbitrary assignable variable.

LIST OF REFERENCE SIGNS

1: vehicle behavior simulator
2: left viewpoint video image generation function
3: right viewpoint video image generation function
4: optical filter function
5: camera format conversion function
6: stereo camera ECU
7: stereo camera model
101: simulation model
102: sensor model
103: environment model
104: vehicle model
105: viewpoint information I/F
106: CAN I/F
201: CG environment information
202: coordinate information reception unit
203: viewpoint video CG generation unit
204: CG video transmission unit
401: CG video reception unit
402: gain adjustment processing unit
403: airbrushing processing unit
404: noise processing unit
405: distortion processing unit
406: CG video transmission unit
501: CG video reception unit
502: color filter conversion unit
503: video format conversion unit
504: CG video transmission I/F
601: CG video reception I/F
602: image recognition unit
603: vehicle control unit
S1: left viewpoint coordinates and attitude
S2: right viewpoint coordinates and attitude
S3: left viewpoint video image
S4: right viewpoint video image S5: optically processed left viewpoint video image
S6: optically processed right viewpoint video image
S7: viewpoint video compatible with camera I/F
S8: optical processing information
S9: shutter signal
S10: vehicle control information such as accelerator operation, brake operation and steering angle
S11: vehicle information

The invention claimed is:

1. An evaluation apparatus for a camera system including a camera for capturing a video image of outside view, comprising:
 a video generation unit for generating a simulation video image simulating the video image of outside view captured by the camera;
 an optical filter unit which performs an optical image processing on the simulation video image in order to simulate the video image outputted from the camera;
 a camera image processing unit which generates a shutter signal and a vehicle control signal by performing a recognition processing by using the processed video image;
 a simulator for simulating a behavior of a vehicle equipped with the camera and an ambient environment thereof; and
 a conversion unit for converting a format of the video,
 wherein
 the video generation unit generates the simulation video image based on an output from the simulator,
 the conversion unit converts the processed video image to a video image in a format compatible with the camera image processing unit, and
 after the image processing, the camera image processing unit performs the recognition processing by using the video converted in the format, thus generating the vehicle control signal, wherein
 the simulator calculates the behavior of the vehicle, camera coordinates and attitude of the vehicle present in the ambient environment, at the timing of the shutter signal.

2. The evaluation apparatus according to claim 1, wherein the optical filter unit is disposed at the video generation unit.

3. The evaluation apparatus according to claim 1, wherein
 the camera is a compound eye camera capturing at least a left viewpoint video image and a right viewpoint video image,
 the video generation unit generates a left viewpoint simulation video image and a right viewpoint simulation video image based on the output from the simulator;
 the optical filter unit performs the optical image processing on each of the left viewpoint simulation video image and the right viewpoint simulation video image based on the output from the camera image processing unit, and outputs the optically processed left viewpoint simulation video image and right viewpoint simulation video image according to a timing signal from the camera image processing unit;
 the conversion unit converts the processed left viewpoint simulation video image and right viewpoint simulation video image to video images in a format compatible with the camera image processing unit; and
 the camera image processing unit performs the recognition processing using the video images converted in format after the image processing, thus generating the vehicle control signal.

4. The evaluation apparatus according to claim 3, wherein the optical filter unit is disposed at the video generation unit.

5. The evaluation apparatus according to claim 1, wherein the optical filter unit performs at least one of a gain adjustment processing, an airbrushing processing, a noise processing and a distortion processing.

6. The evaluation apparatus according to claim 1, wherein the camera image processing unit is an electronic control unit implemented in the camera system.

7. The evaluation apparatus according to claim 1, wherein the camera image processing unit is a camera function simulator implemented by software.

8. A method wherein an arithmetic device provides an evaluation of a camera system including a camera for capturing a video image of outside view, comprising:
 a video generation step where the arithmetic device generates a simulation video image of outside view captured by the camera;
 an optical filter step where the arithmetic device performs an optical image processing on the simulation video image in order to simulate the video image outputted from the camera;
 a camera image processing step where the arithmetic device generates a shutter signal and a vehicle control signal by performing a recognition step by using the processed video image;
 a step simulating a behavior of a vehicle equipped with the camera and an ambient environment thereof;
 a step converting a format of the video,
 a step generating the simulation video image based on the simulated behavior of the vehicle,
 a step converting the processed video image to a video image in a format compatible with the camera image processing unit, and
 after the image processing, a step performing the recognition processing by using the video converted in the format, thus generating the vehicle control signal, wherein
 the simulating the behavior of the vehicle is based on the shutter signal, and includes calculating camera coordinates and attitude of the vehicle present in the ambient environment.

9. The evaluation apparatus according to claim 1, wherein the optical filter unit changes the order of a gain adjustment processing, an airbrushing processing, a noise processing and a distortion processing.

10. The evaluation apparatus according to claim 1, wherein
 the video generation unit generates video data based on brightness information outputted from the camera image processing unit.

11. The evaluation apparatus according to claim 5, wherein
 the video data generated by the video generation unit is converted to video data simulating an optical sensor.

* * * * *